United States Patent
Tie et al.

(10) Patent No.: US 9,264,405 B2
(45) Date of Patent: Feb. 16, 2016

(54) SWITCH EQUIPMENT AND DATA PROCESSING METHOD FOR SUPPORTING LINK LAYER SECURITY TRANSMISSION

(75) Inventors: Manxia Tie, Shaanxi (CN); Qin Li, Shaanxi (CN); Zhiqiang Du, Shaanxi (CN)

(73) Assignee: China IWNCOMM Co., Ltd. (CN)

( * ) Notice: Subject to any disclaimer, the term of this patent is extended or adjusted under 35 U.S.C. 154(b) by 358 days.

(21) Appl. No.: 13/995,593

(22) PCT Filed: Jun. 17, 2011

(86) PCT No.: PCT/CN2011/075856
§ 371 (c)(1),
(2), (4) Date: Jun. 19, 2013

(87) PCT Pub. No.: WO2012/083653
PCT Pub. Date: Jun. 28, 2012

(65) Prior Publication Data
US 2013/0283044 A1    Oct. 24, 2013

(30) Foreign Application Priority Data
Dec. 20, 2010    (CN) .......................... 2010 1 0596665

(51) Int. Cl.
*H04L 29/06*    (2006.01)
*H04L 9/08*    (2006.01)

(52) U.S. Cl.
CPC .............. *H04L 63/0428* (2013.01); *H04L 9/08* (2013.01); *H04L 63/06* (2013.01); *H04L 63/162* (2013.01)

(58) Field of Classification Search
USPC ....................................................... 713/160
See application file for complete search history.

(56) References Cited

U.S. PATENT DOCUMENTS

2006/0130126 A1* 6/2006 Touve et al. ...................... 726/5
2008/0123652 A1  5/2008 Akyol

FOREIGN PATENT DOCUMENTS

| | | |
|---|---|---|
| CN | 101588345 A | 11/2009 |
| CN | 101729249 A | 6/2010 |
| CN | 101741548 A | 6/2010 |
| CN | 101834722 A | 9/2010 |
| CN | 102035845 A | 4/2011 |
| JP | 2008-42715 | 2/2008 |
| JP | 2008-104040 | 5/2008 |
| KR | 10-0675836 | 1/2007 |
| KR | 10-0787128 | 12/2007 |

\* cited by examiner

*Primary Examiner* — Tu Nguyen
(74) *Attorney, Agent, or Firm* — DLA Piper LLP (US)

(57) ABSTRACT

A switch equipment and data processing method for supporting link layer security transmission are provided. The switch equipment for supporting link layer security transmission comprises a switch module and multiple port modules, each port module is electrically connected with the switch module respectively; the port module supports a link layer key management capability, and is used for establishing a share key for encrypting and decrypting data frames between the switch equipment and other network nodes.

10 Claims, 1 Drawing Sheet

SWITCH EQUIPMENT AND DATA PROCESSING METHOD FOR SUPPORTING LINK LAYER SECURITY TRANSMISSION

This application is a US National Stage of International Application No. PCT/CN2011/075856, filed Jun. 17, 2011, designating the United States, and claiming the benefit of Chinese Patent Application No. 201010596665.5, filed with the Chinese Patent Office on Dec. 20, 2010 and entitled "Switch device supporting link layer secured transmission and data processing method thereof," both of which are hereby incorporated by reference in their entireties.

FIELD

The present invention relates to the field of network security and particularly to a switch device supporting link layer secured transmission and a data processing method thereof.

BACKGROUND

A wired local area network is typically a broadcast network in which data transmitted from a node can be received by any other node. The respective nodes on the network share a channel, which poses great potential insecurity to the network. An attacker can capture all data packets on the network simply by accessing the network to listen.

No data security method has been proposed for a Local Area Network (LAN) defined in the existing national standard GB/T 15629.3 (corresponding to the IEEE 802.3 or ISO/IEC 8802-3), and this makes it easy for an attacker to steal key information. In the domain of international researches, a data encryption protocol to secure the Ethernet has been proposed in the IEEE 802.1AE standard established by the IEEE, and a security measure with encryption per hop has been adopted for secured delivery of data between network nodes.

A switch device supporting the GB/T 15629.3 forwards all data packets directly and is incapable of link layer secured transmission, and information of the transmitted data packets is susceptible to interception; and a switch device supporting the IEEE 802.1AE supports only encryption per hop and has to operate to decrypt and then encrypt all the forwarded encrypted data packets, thus resulting in a heavy burden on the switch device and a significant delay in transmission of the data on a network.

SUMMARY

In order to address the foregoing technical problems in the prior art, embodiments of the invention provides a switch device supporting link layer secured transmission with an alleviated computing burden of the switch device and at a low network upgrade cost and a data processing method thereof.

An embodiment of the invention provides a switch device supporting link layer secured transmission, which includes a switch module and a plurality of port modules, and the port modules are electrically connected with the switch module respectively; and the port modules support a link layer key management capability and are configured to create shared keys between the switch device and another network node for encrypting and decrypting a data frame.

An embodiment of the invention further provides a data processing method of a switch device supporting link layer secured transmission, wherein the method includes:

1) an interface module of a port, Port X, of the switch device receiving a data frame, Frame A1, and submitting the data frame to a security process module of the port, Port X, wherein the data frame, Frame A1, includes a first header and a first payload;

2) the security process module of the port, Port X, of the switch device in combination with a key management module and an algorithm module of the port, Port X, processing Frame A1 according to information of the first header of Frame A1 to construct a data frame, Frame A2, and submitting Frame A2 to a switch module of the switch device, wherein Frame A2, includes a second header and a second payload;

3) the switch module of the switch device extracting information of the second header of Frame A2, and if a DA field in the second header is consistent with an MAC address of the switch device, then the switch device delivering the second payload of Frame A2 to an upper layer (e.g., a network layer, an application layer, etc.) of the link layer for processing; otherwise, the switch device switching Frame A2 correctly to a security process module of a port, Port Y, of the switch device according to local MAC address learning information; and 4) the security process module of the port, Port Y, in combination with a key management module and an algorithm module of the port, Port Y, processing Frame A2 according to the information of the second header to construct a data frame, Frame A3, and outputting Frame A3 through an interface module of the port, Port Y, wherein Frame A3 includes a third header and a third payload, and Wherein:

Port X represents a first port module of the switch device, which is an input port of a data frame, Frame A;

Port Y represents a second port module of the switch device, which is an output port of the data frame, Frame A;

Frame A1 represents a data frame received by the interface module by the port, Port X;

Frame A2 represents a data frame submitted by the security process module of the port, Port X, to the switch module; and Frame A3 represents a data frame finally output by the interface module of the port, Port Y, and if Frame A1 received by the switch device is an encrypted data frame, then the switch device needs to decrypt and then encrypt and then forward the data frame, wherein a key used to decrypt the data frame, Frame A1, to construct Frame A2 is denoted by KEY1, and a key used to encrypt the data frame, Frame A2, to construct Frame A3 is denoted by KEY2, and then Port X of the switch device decrypts Frame A1 by KEY1 to construct Frame A2; and Port Y encrypts Frame A2 by KEY2 to construct Frame A3.

The switch device supporting link layer secured transmission according to the embodiment of the invention can support both a data frame in the standard ISO/IEC 8802-3 and data frames in a variety of link layer encryption protocols including a data frame in the IEEE 802.1AE protocol. The variety of link layer encryption protocols can be supported together with the possibility of forward compatibility to thereby perform secured transmission of a data frame at the link layer and improve the security of a network. As compared with an IEEE 802.1AE switch device, the switch device supporting link layer secured transmission according to the embodiment of the invention has the capability to process a data frame including an MAClist field in a link layer encryption protocol in addition to the support of link layer secured transmission so that it is not necessary to operate to decrypt and then encrypt and then forward all the data packets to be forwarded and thus it is possible to lower a computing burden on the switch device. Furthermore the switch device according to the embodiment of the invention supports a variety of data frames and thus is capable of hybrid networking together with other switch devices to thereby lower a network upgrade cost.

DETAILED DESCRIPTION OF THE EMBODIMENTS

Figure 1:
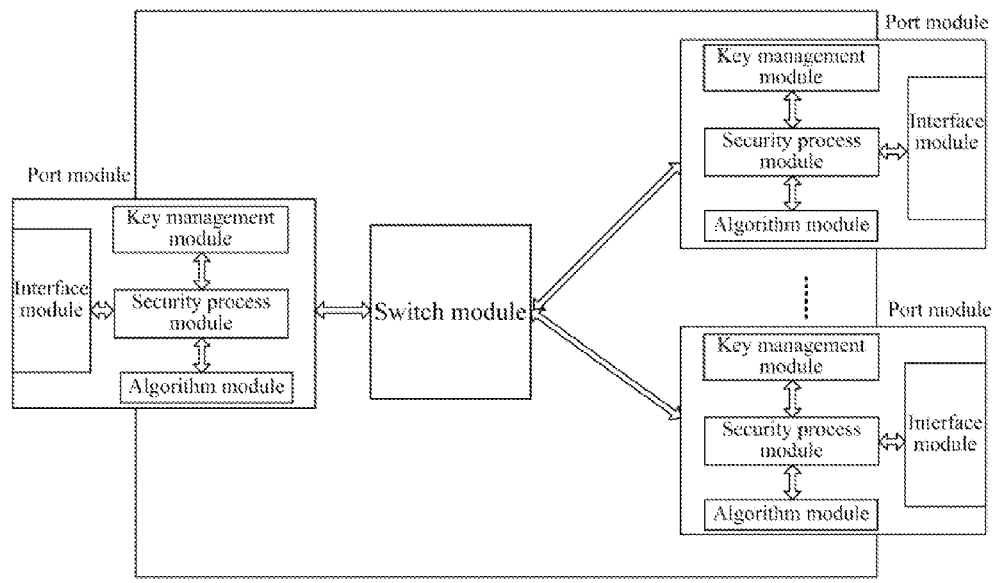
FIG. 1 is a schematic diagram of a switch device supporting link layer secured transmission according to an embodiment of the invention.

Referring to FIG. 1, a switch device supporting link layer secured transmission according to an embodiment of the invention includes a switch module and a plurality of port modules, where all the port modules are electrically connected respectively with the switch module; and each port module includes an algorithm module, an interface module, an security process module and a key management module, and the security process module is electrically connected respectively with the interface module, the algorithm module and the key management module.

Each port module supports a link layer key management capability and can create shared keys between the switch device and another network node for encrypting and decrypting a data frame; and the created shared keys can be pre-shared or can be negotiated about upon successful node identity authentication and are managed and stored by the key management module of the port module.

The algorithm module relates to encryption and decryption algorithms and/or an integrity check algorithm and can be embodied in hardware or in software.

The switch device supporting link layer secured transmission according to the embodiment of the invention supports both a data frame in the standard ISO/IEC 8802-3, and a data frame in a link layer encryption protocol which includes a header and a payload as depicted in Table 1 below:

TABLE 1

| Header | Payload |
|---|---|

Particularly the header is as depicted in Table 2 below:

TABLE 2

| DA | SA | Ethertype | isE | keyIndex | MAClist |
|---|---|---|---|---|---|

Where:

The DA field represents the identifier of a destination node, the value of which is an MAC address of the destination node;

The SA field represents the identifier of a source node, the value of which is an MAC address of the source node;

The Ethertype field represents an Ethernet-type field with the value thereof being an Ethernet-type field in the link layer encryption protocol to identify the corresponding link layer encryption protocol and frame structure;

The is E field represents an encryption flag bit to identify whether the payload of the data frame is plaintext information or ciphertext information of user data, and this field is used by a recipient of the data packet as a criterion to judge whether decryption is required;

The keyIndex field represents the identifier of a key to secure the payload;

The MAClist field represents a list of specific MAC addresses, and this field is an optional field; and The payload field represents information of user data, which can be either plaintext information of the user data or ciphertext information of the user data.

With the presence of the MAClist field, the switch device in the list of specific MAC addresses given in the MAClist field will receive and decrypt the received data frame if it is the destination node or will decrypt and then encrypt and then forward the received data frame if it is not the destination node; and the switch device which is not in the list of specific MAC addresses given in the MAClist field will receive and decrypt the received data frame if it is the destination node or will only forward the received ciphertext data packet directly if it is not the destination node; or With the absence of the MAClist field, the switch device receiving the data frame will receive and decrypt the received data frame if it is the destination node or will decrypt and then encrypt and then forward the received data frame if it is not the destination node.

With the presence of the MAClist field, retrieval information of the key used by the switch device in the list of specific MAC addresses given in the field to decrypt the ciphertext data packet includes MAClist, SA and keyIndex; and retrieval information of the key used for encryption thereof includes MAClist and DA.

With the absence of the MAClist field, the switch device will decrypt and then encrypt and then forward all the ciphertext data packets to be forwarded, and the retrieval information of the key used to decrypt the ciphertext data packet includes SA and keyIndex; and the retrieval information of the key used for encryption thereof includes DA.

A particular method of determining key retrieval information will not be limited to the embodiments of the invention but can depend upon the link layer encryption protocol, identified by Ethertype and supported by the switch device. A unique key can be retrieved by key retrieval information for decryption; and a plurality of keys may be retrieved for encryption by key retrieval information, and the switch device selects one of the keys under a local strategy and fills keyIndex of the selected key into the header of the data frame.

Figure 2:
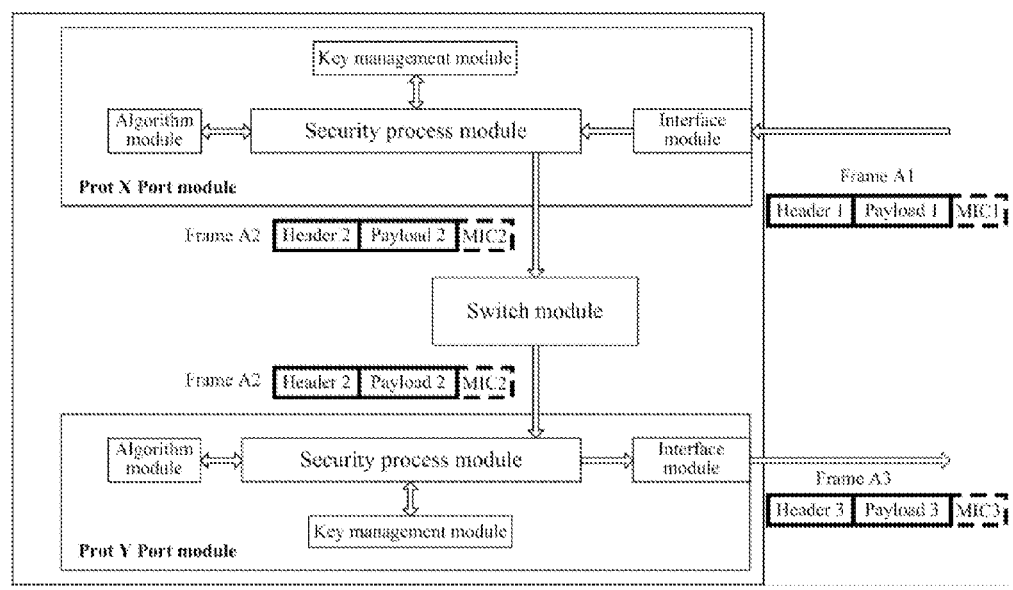
FIG. 2 is a flow chart of a data processing method of a switch device supporting link layer secured transmission according to an embodiment of the invention.

Referring to FIG. 2, a port module of the switch device supporting link layer secured transmission may be an inlet of the switch device or may be an outlet of the switch device.

Taking a data frame, Frame A, as example for a description, Frame A is input via a port, Port X, of the switch device and output via a port, Port Y; and in order to distinguish different Frames A transmitted between different modules, they are identified respectively by Frames A1 to A3, where:

Frame A1 represents a data frame received by the interface module of the port, Port X;

Frame A2 represents a data frame submitted by the security process module of the port, Port X, to the switch module; and Frame A3 represents a data frame finally output by the interface module of the port, Port Y.

If Frame A1 received by the switch device is an encrypted data frame, then the switch device will decrypt and then encrypt and then forward the data frame, where a key used to decrypt the data frame, Frame A1, to construct Frame A2 is denoted by KEY1, and a key used to encrypt the data frame, Frame A2, to construct Frame A3 is denoted by KEY2, and then Port X of the switch device decrypts Frame A1 by KEY1 to construct Frame A2; and Port Y encrypts Frame A2 by KEY2 to construct Frame A3.

An implementation of a data process flow of the switch device supporting link layer secured transmission according to the embodiment of the invention is as follows:

1) The interface module of the port, Port X, of the switch device receives the data frame, Frame A1, and submits Frame A1 to the security process module of the port, Port X;

2) The security process module of the port, Port X, of the switch device in combination with the key management module and the algorithm module of the port, Port X, processes Frame A1 according to information of the header 1 of Frame A1 to construct Frame A2 and submits Frame A2 to the switch module of the switch device;

3) The switch module of the switch device extracts information of the header 2 of Frame A2, and if the DA field in the header 2 is consistent with the MAC address of the switch device, then the switch device delivers the payload 2 of Frame A2 to an upper layer (e.g., the network layer, the application layer, etc.) of the link layer for processing; otherwise, the switch device switches Frame A2 correctly to the security process module of the port, Port Y, according to local MAC address learning information; and 4) The security process module of the port, Port Y, of the switch device in combination with the key management module and the algorithm module of the port, Port Y, processes Frame A2 according to the information of the header 2 to construct Frame A3 and outputs Frame A3 through the interface module of the port, Port Y.

Particularly a particular flow of the forgoing step 2) is as follows:

2.1) The security process module of the port, Port X, determines from the Ethertype field in the data frame, Frame A1, the link layer encryption protocol used for data encapsulation and determines from the is E field whether the payload 1 is encrypted, and if it is encrypted, then the step 2.2) is performed; otherwise, Frame A1 is taken directly as Frame A2, that is, the header 2 is the same as the header 1 and the payload 2 is the same as the payload 2, and the step 2.6) is performed;

2.2) If the MAClist field is present in the data frame, Frame A1, then it is determined whether the MAC address of the switch device is in the list of specific MAC addresses given in the MAClist field, and if it is not in the list, then Frame A1 is taken directly as Frame A2, that is, the header 2 is the same as the header 1 and the payload 2 is the same as the payload 2, and the step 2.6) is performed, or if the MAC address of the switch device is in the list, then the step 2.3) is performed; or if there is no MAClist field in the data frame, Frame A1, then the step 2.3) is performed directly;

2.3) The security process module of the port, Port X, determines from the keyIndex field and the SA field of the data frame, Frame A1, or from the keyIndex field, the SA field and the MAClist field of the data frame, Frame A1, the retrieval information of the key, KEY1, to secure Frame A1 and sends the retrieval information of the key, KEY1, to the key management module of the port, Port X;

2.4) The key management module of the port, Port X searches for the corresponding key, KEY1, by the retrieval information of the key, KEY1, and feeds the key, KEY1, back to the security process module of the port, Port X;

2.5) The security process module of the port, Port X, invokes the algorithm module, inputs the key, KEY1, and the payload 1 of Frame A1, obtains the plaintext information of the payload 1 of Frame A1 through decryption and constructs Frame A2 by taking the plaintext information of the payload 1 of Frame A1 as the payload 2 of Frame A2 and taking the information of the header 1 of Frame A1 directly as the information of the header 2 of Frame A2, that is, the header 2 is the same as the header 1, and the payload 2 is the plaintext information of the payload 1; and 2.6) The security process module of the port, Port X, submits Frame A2 to the switch module.

Particularly a particular flow of the forgoing step 4) is as follows:

4.1) The security process module of the port, Port Y, determines from the Ethertype field in Frame A2 the link layer encryption protocol used for data encapsulation and determines from the is E field whether to encrypt the payload 2 for transmission in a ciphertext form on a network, and if so, then the step 4.2) is performed; otherwise, Frame A2 is taken directly as Frame A3, that is, a header 3 is the same as the header 2, and a payload 3 is the same as the payload 2, and the step 4.6) is performed;

4.2) If the MAClist field is present in the data frame, Frame A2, then it is determined whether the MAC address of the switch device is in the list of specific MAC addresses given in the MAClist field, and if it is not in the list, then Frame A2 is taken directly as Frame A3, that is, the header 3 is the same as the header 2 and the payload 3 is the same as the payload 2, and the step 4.6) is performed directly, or if the MAC address of the switch device is in the list, then the step 4.3) is performed; or if there is no MAClist field in the data frame, Frame A2, then the step 4.3) is performed directly;

4.3) The security process module of the port, Port Y, determines from the DA field of the data frame, Frame A2, or from the DA field and the MAClist field of the data frame, Frame A2, the retrieval information of the key, KEY2, to secure Frame A2, sends the retrieval information of the key, KEY2, to the key management module of the port, Port Y, and performs the step 4.4);

4.4) The key management module of the port, Port Y searches for available keys by the retrieval information of the key, KEY2, selects a key, KEY2, according to a local strategy and feeds the key, KEY2, and the identifier keyIndex of the key, KEY2, back to the security process module of the port, Port Y;

4.5) The security process module of the port, Port Y, invokes the algorithm module, inputs the key, KEY2, and the payload 2 of Frame A2, obtains ciphertext information of the payload 2 of Frame A2 through encryption and constructs Frame A3 by taking the ciphertext information of the payload 2 of Frame A2 as the payload 3 of Frame A3 and updating with keyIndex of the used key, KEY2, the keyIndex field in the header 2 of Frame A2 as information of the header 3 of Frame A3, that is, the header 3 is the header 2 with the keyIndex field updated with keyIndex of KEY2, and the payload 3 is the ciphertext information of the payload 2; and 4.6) The security process module of the port, Port Y, outputs Frame A3 through the interface module.

In another embodiment, the data frame, in the link layer encryption protocol, supported by the switch device supporting link layer secured transmission according to the embodiment of the invention can further include an MIC field (e.g., MIC1, MIC2, and MIC3 in FIG. 2) representing an integrity check code which is an integrity check value as a result of calculation on the data frame, Frame (e.g., Frame A1, Frame A2 and Frame A3 in FIG. 2); and the integrity check MIC calculation covers a range of fields determined by the link layer encryption protocol corresponding to Ethertype supported by the switch device, and in an implementation in which the MIC field is supported, the key to secure the data frame includes two parts, one of which is an integrity check key, and the other of which is a session encryption key, where the integrity check key is used to calculate the integrity check code MIC on the data frame, and the session encryption key is used to encrypt the payload of the data frame.

A process of the switch device supporting link layer secured transmission to secure the data frame can firstly calculate the integrity check code on the data frame to construct the MIC field and then encrypt the user data of the data frame to construct the payload field; or can firstly encrypt the user data of the data frame to construct the payload field and then calculate the integrity check code to construct the MIC field.

Since the encryption process involves two strategies with encryption and without encryption, whether decryption is required will firstly be determined upon reception and then the MIC field can be verified for correctness in the alternative in which the integrity check code is firstly calculated to construct the MIC field; and In the alternative in which the integrity check code is then calculated to construct the MIC field, firstly the MIC field can be verified for correctness upon reception and then whether decryption is required will be determined, where:

I. when the integrity check code is firstly calculated on the data frame to construct the MIC field and then user data of the data frame is encrypted to construct the payload field, a particular flow of the forgoing step 2) is as follows:

2.1) The security process module of the port, Port X, determines from the Ethertype field in the data frame, Frame A1, the link layer encryption protocol used for data encapsulation;

2.2) If the MAClist field is present in the data frame, Frame A1, then it is determined whether the MAC address of the switch device is in the list of specific MAC addresses given in the MAClist field, and if it is not in the list, then Frame A1 is taken directly as Frame A2, that is, the header 2 is the same as the header 1, the payload 2 is the same as the payload 1, and MIC2 is the same as MIC1, and the step 2.9) is performed, or if the MAC address of the switch device is in the list, then the step 2.3) is performed; or if there is no MAClist field in the data frame, Frame A1, then the step 2.3) is performed directly;

2.3) The security process module of the port, Port X, determines from the keyIndex field and the SA field of the data frame, Frame A1, or from the keyIndex field, the SA field and the MAClist field of the data frame, Frame A1, the retrieval information of the key, KEY1, to secure Frame A1 and sends the retrieval information of the key, KEY1, to the key management module of the port, Port X;

2.4) The key management module of the port, Port X searches for the corresponding key, KEY1, by the retrieval information of the key, KEY1, and feeds the key, KEY1, back to the security process module of the port, Port X;

2.5) The security process module of the port, Port X, determines from the is E field whether the payload 1 is encrypted, and if it is encrypted, then the step 2.6) is performed; otherwise, the payload 1 of Frame A1 is plaintext information of the payload 1, and the step 2.7) is performed directly;

2.6) The security process module of the port, Port X, invokes the algorithm module, inputs the session encryption key of the key, KEY1, and the payload 1 of Frame A1, and obtains the plaintext information of the payload 1 of Frame A1 through decryption;

2.7) The security process module of the port, Port X, invokes the algorithm module, inputs the integrity check key of the key, KEY1, and the plaintext information of the payload 1 of Frame A1 and verifies the MIC1 field for correctness; and if it is correct, then 2.8) is performed; otherwise, the packet is discarded;

2.8) The security process module of the port, Port X, constructs Frame A2 by taking the plaintext information of the payload 1 of Frame A1 as the payload 2 of Frame A2 and taking the information of the header 1 of Frame A1 directly as the information of the header 2 of Frame A2, that is, the header 2 is the same as the header 1, and the payload 2 is a plaintext of the payload 1; and 2.9) The security process module of the port, Port X, submits Frame A2 to the switch module.

A particular flow of the forgoing step 4) is as follows:

4.1) The security process module of the port, Port Y, determines from the Ethertype field in Frame A2 the link layer encryption protocol used for data encapsulation;

4.2) If the MAClist field is present in the data frame, Frame A2, then it is determined whether the MAC address of the switch device is in the list of specific MAC addresses given in the MAClist field, and if it is not in the list, then Frame A2 is taken directly as Frame A3, that is, a header 3 is the same as the header 2, a payload 3 is the same as the payload 2, and MIC3 is the same as MIC2, and the step 4.9) is performed directly, or if the MAC address of the switch device is in the list, then the step 4.3) is performed; or if there is no MAClist field in the data frame, Frame A2, then the step 4.3) is performed directly;

4.3) The security process module of the port, Port Y, determines from the DA field of the data frame, Frame A2, or from the DA field and the MAClist field of the data frame, Frame A2, the retrieval information of the key, KEY2, to secure Frame A2, sends the retrieval information of the key, KEY2, to the key management module of the port, Port Y, and performs the step 4.4);

4.4) The key management module of the port, Port Y searches for available keys by the retrieval information of the key, KEY2, selects a key, KEY2, according to a local strategy and feeds the key, KEY2, and the identifier keyIndex of the key, KEY2, back to the security process module of the port, Port Y;

4.5) The security process module of the port, Port Y, invokes the algorithm module, inputs the integrity check key of the key, KEY2, and the payload 2 of Frame A2 and calculates the integrity check code MIC3 field;

4.6) The security process module of the port, Port Y, determines from the is E field of the data frame, Frame A2, whether to encrypt the payload 2 for transmission in a ciphertext form on a network, and if so, then the step 4.7) is performed; otherwise, the step 4.8) is performed;

4.7) The security process module of the port, Port Y, invokes the algorithm module, inputs the session encryption key of the key, KEY2, and the payload 2 of Frame A2, obtains ciphertext information of the payload 2 of Frame A2 through encryption, constructs Frame A3 by taking the ciphertext information of the payload 2 of Frame A2 as the payload 3 of Frame A3, updating with keyIndex of the used key, KEY2, the keyIndex field in the header 2 of Frame A2 as information of the header 3 of Frame A3 and taking MIC3 calculated in the step 4.5) as the MIC3 field of Frame A3, that is, the header 3 is the header 2 with the keyIndex field updated with keyIndex of KEY2, the payload 3 is the ciphertext information of the payload 2, and MIC3 is MIC3 calculated in the step 4.5), and performs the step 4.9); and 4.8) The security process module of the port, Port Y, constructs Frame A3 by taking the payload 2 of Frame A2 directly as the payload 3 of Frame A3, updating with keyIndex of the used key, KEY2, the keyIndex field in the header 2 of Frame A2 as information of the header 3 of Frame A3 and taking MIC3 calculated in the step 4.5) as the MIC3 field of Frame A3, that is, the header 3 is the header 2 with the keyIndex field updated with keyIndex of KEY2, the payload 3 is same as the payload 2, and MIC3 is MIC3 calculated in the step 4.5), and performs the step 4.9); and 4.9) The security process module of the port, Port Y, outputs Frame A3 through the interface module.

II. when user data of the data frame is firstly encrypted to construct the payload field and then the integrity check code is calculated to construct the MIC field, a particular flow of the forgoing step 2) is as follows:

2.1) The security process module of the port, Port X, determines from the Ethertype field in the data frame, Frame A1, the link layer encryption protocol used for data encapsulation;

2.2) If the MAClist field is present in the data frame, Frame A1, then it is determined whether the MAC address of the switch device is in the list of specific MAC addresses given in the MAClist field, and if it is not in the list, then Frame A1 is taken directly as Frame A2, that is, the header 2 is the same as the header 1, the payload 2 is the same as the payload 1, and MIC2 is the same as MIC1, and the step 2.9) is performed, or if the MAC address of the switch device is in the list, then the step 2.3) is performed; or if there is no MAClist field in the data frame, Frame A1, then the step 2.3) is performed directly;

2.3) The security process module of the port, Port X, determines from the keyIndex field and the SA field of the data frame, Frame A1, or from the keyIndex field, the SA field and the MAClist field of the data frame, Frame A1, the retrieval information of the key, KEY1, to secure Frame A1 and sends the retrieval information of the key, KEY1, to the key management module of the port, Port X;

2.4) The key management module of the port, Port X searches for the corresponding key, KEY1, by the retrieval information of the key, KEY1, and feeds the key, KEY1, back to the security process module of the port, Port X;

2.5) The security process module of the port, Port X, invokes the algorithm module, inputs the integrity check key of the key, KEY1, and the payload 1 of Frame A1 and verifies the MIC1 field for correctness, and if it is correct, then the step 2.6) is performed; otherwise, the packet is discarded;

2.6) The security process module of the port, Port X, determines from the is E field whether the payload 1 is encrypted, and if it is encrypted, then the step 2.7) is performed; otherwise, the payload 1 of Frame A1 is plaintext information of the payload 1, and the step 2.8) is performed directly;

2.7) The security process module of the port, Port X, invokes the algorithm module, inputs the session encryption key of the key, KEY1, and the payload 1 of Frame A1 and obtains the plaintext information of the payload 1 of Frame A1 through decryption;

2.8) The security process module of the port, Port X, constructs Frame A2 by taking the plaintext information of the payload 1 of Frame A1 as the payload 2 of Frame A2 and taking the information of the header 1 of Frame A1 directly as the information of the header 2 of Frame A2, that is, the header 2 is the same as the header 1, and the payload 2 is the plaintext information of the payload 1; and 2.9) The security process module of the port, Port X, submits Frame A2 to the switch module.

A particular flow of the forgoing step 4) is as follows:

4.1) The security process module of the port, Port Y, determines from the Ethertype field in Frame A2 the link layer encryption protocol used for data encapsulation;

4.2) If the MAClist field is present in the data frame, Frame A2, then it is determined whether the MAC address of the switch device is in the list of specific MAC addresses given in the MAClist field, and if it is not in the list, then Frame A2 is taken directly as Frame A3, that is, a header 3 is the same as the header 2, a payload 3 is the same as the payload 2, and MIC3 is the same as MIC2, and the step 4.9) is performed directly, or if the MAC address of the switch device is in the list, then the step 4.3) is performed; or if there is no MAClist field in the data frame, Frame A2, then the step 4.3) is performed directly;

4.3) The security process module of the port, Port Y, determines from the DA field of the data frame, Frame A2, or from the DA field and the MAClist field of the data frame, Frame A2, the retrieval information of the key, KEY2, to secure Frame A2, sends the retrieval information of the key, KEY2, to the key management module of the port, Port Y, and performs the step 4.4);

4.4) The key management module of the port, Port Y searches for available keys by the retrieval information of the key, KEY2, selects a key, KEY2, according to a local strategy and feeds the key, KEY2, and the identifier keyIndex of the key, KEY2, back to the security process module of the port, Port Y;

4.5) The security process module of the port, Port Y, determines from the is E field of the data frame, Frame A2, whether to encrypt the payload 2 for transmission in a ciphertext form on a network, and if so, then the step 4.6) is performed; otherwise, the step 4.8) is performed;

4.6) The security process module of the port, Port Y, invokes the algorithm module, inputs the session encryption key of the key, KEY2, and the payload 2 of Frame A2 and obtains ciphertext information of the payload 2 of Frame A2 through encryption;

4.7) The security process module of the port, Port Y, invokes the algorithm module, inputs the integrity check key of the key, KEY2, and ciphertext information of the payload 2 of Frame A2, calculates the integrity check code MIC3 field, constructs Frame A3 by taking the ciphertext information of the payload 2 of Frame A2 as the payload 3 of Frame A3, updating with keyIndex of the used key, KEY2, the keyIndex field in the header 2 of Frame A2 as information of the header 3 of Frame A3 and taking calculated MIC3 as the MIC3 field of Frame A3, that is, the header 3 is the header 2 with the keyIndex field updated with keyIndex of KEY2, the payload 3 is the ciphertext information of the payload 2, and MIC3 is MIC3 calculated in the step 4.7), and performs the step 4.9);

4.8) The security process module of the port, Port Y, invokes the algorithm module, inputs the integrity check key of the key, KEY2, and the payload 2 of Frame A2, calculates the integrity check code MIC3 field, constructs Frame A3 by taking the payload 2 of Frame A2 directly as the payload 3 of Frame A3, updating with keyIndex of the used key, KEY2, the keyIndex field in the header 2 of Frame A2 as information of the header 3 of Frame A3 and taking calculated MIC3 as MIC3 of Frame A3, that is, the header 3 is the header 2 with the keyIndex field updated with keyIndex of KEY2, the payload 3 is same as the payload 2, and MIC3 is MIC3 calculated in the step 4.8), and performs the step 4.9); and 4.9) The security process module of the port, Port Y, outputs Frame A3 through the interface module.

The invention claimed is:

1. A switch device supporting link layer secured transmission, wherein the switch device supporting link layer secured transmission comprises a switch module and a plurality of port modules, and the port modules are electrically connected respectively with the switch module; and the port modules support a link layer key management capability and are configured to create shared keys between the switch device and another network node for encrypting and decrypting a data frame, wherein the port modules comprise a port, Port X, and a port, Port Y, each comprising an algorithm module, an interface module, a security process module and a key management module, and the security process module is electrically connected respectively with the interface module, the algorithm module and the key management module, wherein the key management module is configured to manage and store the shared keys; and the algorithm module relates to encryption and decryption algorithms and/or an integrity check algorithm and is embodied in hardware or in software, wherein Port X represents a first port module of the switch device, which is an input port of a data frame, Frame A, wherein port Y is a second port module of the switch device, which is an output port of the data frame, Frame A, wherein the interface module of the port, Port X, of the switch device is configured to receive a data frame, Frame A1, and submit Frame A1 to the security process module of the port, Port X, wherein the data frame, Frame A1, comprises a first header and a first payload;

the security process module of the port, Port X, of the switch device is configured to process Frame A1 in combination with the key management module and the algorithm module of the port, Port X, according to information of the first header of Frame A1 to construct a data frame, Frame A2, and submit Frame A2 to the switch module of the switch device, wherein Frame A2 comprises a second header and a second payload;

the switch module of the switch device is configured to extract information of the second header of Frame A2, and if a DA field in the second header is consistent with an MAC address of the switch device, then the switch module is configured to deliver the second payload of Frame A2 to an upper layer of the link layer for processing; otherwise, the switch module is configured to switch Frame A2 correctly to the security process module of the port, Port Y, according to local MAC address learning information;

the security process module of the port, Port Y, of the switch device is configured to process Frame A2 in combination with the key management module and the algorithm module of the port, Port Y, according to information of the second header to construct a data frame, Frame A3, and output Frame A3 through the interface module of the port, Port Y, wherein Frame A3 comprises a third header and a third payload, wherein Frame A1 represents a data frame received by the interface module of the port, Port X;

Frame A2 represents a data frame submitted by the security process module of the port, Port X, to the switch module; and Frame A3 represents a data frame finally output by the interface module of the port, Port Y, and if Frame A1 received by the switch device is an encrypted data frame, then the switch device will decrypt and then encrypt and then forward the data frame, wherein a key used to decrypt the data frame, Frame A1, to construct Frame A2 is denoted by KEY1, and a key used to encrypt the data frame, Frame A2, to construct Frame A3 is denoted by KEY2, and then Port X of the switch device decrypts Frame A1 by KEY1 to construct Frame A2; and Port Y encrypts Frame A2 by KEY2 to construct Frame A3.

2. The switch device supporting link layer secured transmission according to claim 1, wherein:

the shared keys are pre-shared or negotiated about upon successful node identity authentication.

3. A data process method of a switch device supporting link layer secured transmission, comprising:

1) receiving, by an interface module of a port, Port X of the switch device, a data frame, Frame A1, and submitting Frame A1 to a security process module of the port, Port X, wherein the data frame, Frame A1, comprises a first header and a first payload;

2) processing, by the security process module of the port, Port X, of the switch device in combination with a key management module and an algorithm module of the port, Port X, Frame A1 according to information of the first header of Frame A1 to construct a data frame, Frame A2, and submitting Frame A2 to a switch module of the switch device, wherein Frame A2 comprises a second header and a second payload;

3) extracting, by the switch module of the switch device, information of the second header of Frame A2, and if a DA field in the second header is consistent with an MAC address of the switch device, then the switch device delivering the second payload of Frame A2 to an upper layer of the link layer for processing; otherwise, the switch device switching Frame A2 correctly to a security process module of a port, Port Y, according to local MAC address learning information; and 4) processing, by the security process module of the port, Port Y, of the switch device in combination with a key management module and an algorithm module of the port, Port Y, Frame A2 according to information of the second header to construct a data frame, Frame A3, and outputting Frame A3 through an interface module of the port, Port Y, wherein Frame A3 comprises a third header and a third payload, and wherein Port X represents a first port module of the switch device, which is an input port of a data frame, Frame A;

Port Y is a second port module of the switch device, which is an output port of the data frame, Frame A;

Frame A1 represents a data frame received by the interface module of the port, Port X;

Frame A2 represents a data frame submitted by the security process module of the port, Port X, to the switch module; and Frame A3 represents a data frame finally output by the interface module of the port, Port Y, and if Frame A1 received by the switch device is an encrypted data frame, then the switch device will decrypt and then encrypt and then forward the data frame, wherein a key used to decrypt the data frame, Frame A1, to construct Frame A2 is denoted by KEY1, and a key used to encrypt the data frame, Frame A2, to construct Frame A3 is denoted by KEY2, and then Port X of the switch device decrypts Frame A1 by KEY1 to construct Frame A2; and Port Y encrypts Frame A2 by KEY2 to construct Frame A3.

4. The data process method of the switch device supporting link layer secured transmission according to claim 3, wherein the switch device supports a data frame in a standard ISO/IEC 8802-3 or a data frame in a link layer encryption protocol.

5. The data process method of the switch device supporting link layer secured transmission according to claim 4, wherein when the switch device supports a data frame in a link layer encryption protocol, the data frame in the link layer encryption protocol comprises a header field and a payload field, and the header field comprises a DA field, an SA field, an Ethertype field, an isE field, a keyIndex field and an MAClist field, wherein the DA field represents an identifier of a destination node, the value of which is an MAC address of the destination node;

the SA field represents an identifier of a source node, the value of which is an MAC address of the source node;

the Ethertype field represents an Ethernet-type field with the value thereof being an Ethernet-type field in the link layer encryption protocol to identify the corresponding link layer encryption protocol and frame structure;

the isE field represents an encryption flag bit to identify whether the payload of the data frame is plaintext information or ciphertext information of user data, and this field is used by a recipient of the data packet as a criterion to judge whether decryption is required;

the keyIndex field represents an identifier of a key to secure the payload;

the MAClist field represents a list of specific MAC addresses, and this field is an optional field; and the payload field represents information of user data, which is either plaintext information of the user data or ciphertext information of the user data.

6. The data process method of the switch device supporting link layer secured transmission according to claim 5, wherein with a presence of the MAClist field, a switch device in the list of specific MAC addresses given in the MAClist field will receive and decrypt a received data frame if the switch device is a destination node or will decrypt and then encrypt and then forward the received data frame if the switch device is not the destination node; and a switch device which is not in the list of specific MAC addresses given in the MAClist field will receive and decrypt a received data frame if the switch device is the destination node or will only forward the received ciphertext data packet directly if the switch device is not the destination node; or with an absence of the MAClist field, a switch device receiving a data frame will receive and decrypt the received data frame if the switch device is the destination node or will decrypt and then encrypt and then forward the received data frame if the switch device is not the destination node; and with the presence of the MAClist field, retrieval information of a key used by a switch device in the list of specific MAC addresses given in the MAClist field to decrypt a ciphertext data packet comprises MAClist, SA and keyIndex; and retrieval information of a key used for encryption comprises MAClist and DA; or with the absence of the MAClist field, a switch device will decrypt and then encrypt and then forward all ciphertext data packets to be forwarded, and retrieval information of a key used to decrypt a ciphertext data packet comprises SA and keyIndex; and retrieval information of a key used for encryption comprises DA.

7. The data process method of the switch device supporting link layer secured transmission according to claim 6, wherein the step 2) comprises:

2.1.1) determining, by the security process module of the port, Port X, from the Ethertype field in the data frame, Frame A1, the link layer encryption protocol used for data encapsulation and determining from the isE field whether the first payload is encrypted, and if it is encrypted, then performing a step 2.1.2); otherwise, taking Frame A1 as Frame A2 and performing a step 2.1.6);

2.1.2) if the MAClist field is present in the data frame, Frame A1, then determining whether the MAC address of the switch device is in the list of specific MAC addresses given in the MAClist field, and if it is not in the list, then taking Frame A1 as Frame A2 and performing the step 2.1.6), or if the MAC address of the switch device is in the list, then performing a step 2.1.3); or if there is no MAClist field in the data frame, Frame A1, then performing the step 2.1.3);

2.1.3) determining, by the security process module of the port, Port X, from the keyIndex field and the SA field of the data frame, Frame A1, or from the keyIndex field, the SA field and the MAClist field of the data frame, Frame A1, retrieval information of the key, KEY1, to secure Frame A1 and sending the retrieval information of the key, KEY1, to the key management module of the port, Port X;

2.1.4) searching, by the key management module of the port, Port X, for the corresponding key, KEY1, by the retrieval information of the key, KEY1, and feeding the key, KEY1, back to the security process module of the port, Port X;

2.1.5) invoking, by the security process module of the port, Port X, the algorithm module, inputting the key, KEY1, and the first payload of Frame A1, obtaining plaintext information of the first payload of Frame A1 through decryption and constructing Frame A2 by taking the plaintext information of the first payload of Frame A1 as the second payload of Frame A2 and taking information of the first header of Frame A1 as information of the second header of Frame A2; and 2.1.6) submitting, by the security process module of the port, Port X, Frame A2 to the switch module; and the step 4) comprises:

4.1.1) determining, by the security process module of the port, Port Y, from the Ethertype field in Frame A2 the link layer encryption protocol used for data encapsulation and determining from the isE field whether to encrypt the second payload for transmission in a ciphertext form on a network, and if so, then performing a step 4.1.2); otherwise, taking Frame A2 as Frame A3 and performing a step 4.1.6);

4.1.2) if the MAClist field is present in the data frame, Frame A2, then determining whether the MAC address of the switch device is in the list of specific MAC addresses given in the MAClist field, and if it is not in the list, then taking Frame A2 as Frame A3 and performing the step 4.1.6), or if the MAC address of the switch device is in the list, then performing a step 4.1.3); or if there is no MAClist field in the data frame, Frame A2, then performing the step 4.1.3);

4.1.3) determining, by the security process module of the port, Port Y, from the DA field of the data frame, Frame A2, or from the DA field and the MAClist field of the data frame, Frame A2, retrieval information of the key, KEY2, to secure Frame A2, and sending the retrieval information of the key, KEY2, to the key management module of the port, Port Y;

4.1.4) searching, by the key management module of the port, Port Y, for available keys by the retrieval information of the key, KEY2, selecting a key, KEY2, according to a local strategy and feeding the key, KEY2, and an identifier keyIndex of the key, KEY2, back to the security process module of the port, Port Y;

4.1.5) invoking, by the security process module of the port, Port Y, the algorithm module, inputting the key, KEY2, and the second payload of Frame A2, obtaining ciphertext information of the second payload of Frame A2 through encryption and constructing Frame A3 by taking the ciphertext information of the second payload of Frame A2 as the third payload of Frame A3 and updating with keyIndex of the used key, KEY2, the keyIndex field in the second header of Frame A2 as information of the third header of Frame A3; and 4.1.6) outputting, by the security process module of the port, Port Y, Frame A3 through the interface module.

8. The data process method of the switch device supporting link layer secured transmission according to claim 5, wherein when the switch device supporting link layer secured transmission supports a data frame in the link layer encryption protocol, the supported data frame in the link layer encryption protocol further comprises in its header an MIC field representing an integrity check code which is an integrity check value as a result of calculation on the data frame, Frame; and the integrity check MIC calculation covers a range of fields determined by the link layer encryption protocol corresponding to Ethertype supported by the switch device, and when a security process is performed on the data frame, a key to secure the data frame comprises two parts, one of which is an integrity check key, and the other of which is a session encryption key, wherein the integrity check key is used to calculate the integrity check code MIC on the data frame, and the session encryption key is used to encrypt a payload of the data frame; and MIC1 represents an integrity check value calculated on the data frame, Frame A1, MIC2 represents an integrity check value calculated on the data frame, Frame A2, and MIC2 represents an integrity check value calculated on the data frame, Frame A3.

9. The data process method of the switch device supporting link layer secured transmission according to claim 8, wherein the security process firstly calculates the integrity check code on the data frame to construct the MIC field and then encrypts user data of the data frame to construct a payload field, the step 2) comprises:

2.2.1) determining, by the security process module of the port, Port X, from the Ethertype field in the data frame, Frame A1, the link layer encryption protocol used for data encapsulation;

2.2.2) if the MAClist field is present in the data frame, Frame A1, then determining whether the MAC address of the switch device is in the list of specific MAC addresses given in the MAClist field, and if it is not in the list, then taking Frame A1 as Frame A2 and performing a step 2.2.9), or if the MAC address of the switch device is in the list, then performing a step 2.2.3); or if there is no MAClist field in the data frame, Frame A1, then performing the step 2.2.3);

2.2.3) determining, by the security process module of the port, Port X, from the keyIndex field and the SA field of the data frame, Frame A1, or from the keyIndex field, the SA field and the MAClist field of the data frame, Frame A1, retrieval information of the key, KEY1, to secure Frame A1 and sending the retrieval information of the key, KEY1, to the key management module of the port, Port X;

2.2.4) searching, by the key management module of the port, Port X, for the corresponding key, KEY1, by the retrieval information of the key, KEY1, and feeding the key, KEY1, back to the security process module of the port, Port X;

2.2.5) determining, by the security process module of the port, Port X, from the isE field whether the first payload is encrypted, and if it is encrypted, then performing a step 2.2.6); otherwise, the first payload of Frame A1 being plaintext information of the first payload and performing a step 2.2.7);

2.2.6) invoking, by the security process module of the port, Port X, the algorithm module, inputting a session encryption key of the key, KEY1, and the first payload of Frame A1, and obtaining the plaintext information of the first payload of Frame A1;

2.2.7) invoking, by the security process module of the port, Port X, the algorithm module, inputting an integrity check key of the key, KEY1, and the plaintext information of the first payload of Frame A1 and verifying the MIC1 field for correctness; and if it is correct, then performing a step 2.2.8); otherwise, discarding the packet;

2.2.8) constructing, by the security process module of the port, Port X, Frame A2 by taking the plaintext information of the first payload of Frame A1 as the second payload of Frame A2 and taking information of the first header of Frame A1 as information of the second header of Frame A2; and 2.2.9) submitting, by the security process module of the port, Port X, Frame A2 to the switch module; and the step 4) comprises:

4.2.1) determining, by the security process module of the port, Port Y, from the Ethertype field in Frame A2 the link layer encryption protocol used for data encapsulation;

4.2.2) if the MAClist field is present in the data frame, Frame A2, then determining whether the MAC address of the switch device is in the list of specific MAC addresses given in the MAClist field, and if it is not in the list, then taking Frame A2 as Frame A3 and performing a step 4.2.9), or if the MAC address of the switch device is in the list, then performing a step 4.2.3); or if there is no MAClist field in the data frame, Frame A2, then performing the step 4.2.3);

4.2.3) determining, by the security process module of the port, Port Y, from the DA field of the data frame, Frame A2, or from the DA field and the MAClist field of the data frame, Frame A2, retrieval information of the key, KEY2, to secure Frame A2, and sending the retrieval information of the key, KEY2, to the key management module of the port, Port Y;

4.2.4) searching, by the key management module of the port, Port Y, for available keys by the retrieval information of the key, KEY2, selecting a key, KEY2, according to a local strategy and feeding the key, KEY2, and an identifier keyIndex of the key, KEY2, back to the security process module of the port, Port Y;

4.2.5) invoking, by the security process module of the port, Port Y, the algorithm module, inputting an integrity check key of the key, KEY2, and the second payload of Frame A2 and calculating the integrity check code MIC3 field;

4.2.6) determining, by the security process module of the port, Port Y, from the isE field of the data frame, Frame A2, whether to encrypt the second payload for transmission in a ciphertext form on a network, and if so, then performing a step 4.2.7); otherwise, performing a step 4.2.8);

4.2.7) invoking, by the security process module of the port, Port Y, the algorithm module, inputting a session encryption key of the key, KEY2, and the second payload of Frame A2, obtaining ciphertext information of the second payload of Frame A2 through encryption, constructing Frame A3 by taking the ciphertext information of the second payload of Frame A2 as the third payload of Frame A3, updating with keyIndex of the used key, KEY2, the keyIndex field in the second header of Frame A2 as information of the third header of Frame A3 and taking MIC3 calculated in the step 4.2.5) as a MIC3 field of Frame A3, and performing the step 4.2.9); and 4.2.8) constructing, by the security process module of the port, Port Y, Frame A3 by taking the second payload of Frame A2 as the third payload of Frame A3, updating with keyIndex of the used key, KEY2, the keyIndex field in the second header of Frame A2 as information of the third header of Frame A3 and taking MIC3 calculated in the step 4.2.5) as the MIC3 field of Frame A3; and 4.2.9) outputting, by the security process module of the port, Port Y, Frame A3 through the interface module.

10. The data process method of the switch device supporting link layer secured transmission according to claim 8, wherein the security process firstly encrypts user data of the data frame to construct the payload field and then calculates the integrity check code to construct the MIC field, the step 2) comprises:

2.3.1) determining, by the security process module of the port, Port X, from the Ethertype field in the data frame, Frame A1, the link layer encryption protocol used for data encapsulation;

2.3.2) if the MAClist field is present in the data frame, Frame A1, then determining whether the MAC address of the switch device is in the list of specific MAC addresses given in the MAClist field, and if it is not in the list, then taking Frame A1 as Frame A2 and performing a step 2.3.9), or if the MAC address of the switch device is in the list, then performing a step 2.3.3); or if there is no MAClist field in the data frame, Frame A1, then performing the step 2.3.3);

2.3.3) the security process module of the port, Port X, determining, by the security process module of the port, Port X, from the keyIndex field and the SA field of the data frame, Frame A1, or from the keyIndex field, the SA field and the MAClist field of the data frame, Frame A1, retrieval information of the key, KEY1, to secure Frame A1 and sending the retrieval information of the key, KEY1, to the key management module of the port, Port X;

2.3.4) the key management module of the port, Port X searching, by the key management module of the port, Port X, for the corresponding key, KEY1, by the retrieval information of the key, KEY1, and feeding the key, KEY1, back to the security process module of the port, Port X;

2.3.5) invoking, by the security process module of the port, Port X, the algorithm module, inputting an integrity check key of the key, KEY1, and the first payload of Frame A1 and verifying the MIC1 field for correctness, and if it is correct, then performing a step 2.3.6); otherwise, discarding the packet;

2.3.6) determining, by the security process module of the port, Port X, from the isE field whether the first payload is encrypted, and if it is encrypted, then performing a step 2.3.7); otherwise, the first payload of Frame A1 being plaintext information of the first payload and performing a step 2.3.8);

2.3.7) invoking, by the security process module of the port, Port X, the algorithm module, inputting a session encryption key of the key, KEY1, and the first payload of Frame A1 and obtaining the plaintext information of the first payload of Frame A1 through decryption;

2.3.8) constructing, by the security process module of the port, Port X, Frame A2 by taking the plaintext information of the first payload of Frame A1 as the second payload of Frame A2 and taking information of the first header of Frame A1 as information of the second header of Frame A2; and 2.3.9) submitting, by the security process module of the port, Port X, Frame A2 to the switch module; and the step 4) comprises:

4.3.1) determining, by the security process module of the port, Port Y, from the Ethertype field in Frame A2 the link layer encryption protocol used for data encapsulation;

4.3.2) if the MAClist field is present in the data frame, Frame A2, then determining whether the MAC address of the switch device is in the list of specific MAC addresses given in the MAClist field, and if it is not in the list, then taking Frame A2 as Frame A3 and performing a step 4.3.9), or if the MAC address of the switch device is in the list, then performing a step 4.3.3); or if there is no MAClist field in the data frame, Frame A2, then performing the step 4.3.3);

4.3.3) determining, by the security process module of the port, Port Y, from the DA field of the data frame, Frame A2, or from the DA field and the MAClist field of the data frame, Frame A2, retrieval information of the key, KEY2, to secure Frame A2, sending the retrieval information of the key, KEY2, to the key management module of the port, Port Y and performing a step 4.3.4);

4.3.4) searching, by the key management module of the port, Port Y, for available keys by the retrieval information of the key, KEY2, selecting the key, KEY2, according to a local strategy and feeding the key, KEY2, and an identifier keyIndex of the key, KEY2, back to the security process module of the port, Port Y;

4.3.5) determining, by the security process module of the port, Port Y, from the isE field of the data frame, Frame A2, whether to encrypt the second payload for transmission in a ciphertext form on a network, and if so, then performing a step 4.3.6); otherwise, a step 4.3.8);

4.3.6) invoking, by the security process module of the port, Port Y, the algorithm module, inputting a session encryption key of the key, KEY2, and the second payload of Frame A2 and obtaining ciphertext information of the second payload of Frame A2 through encryption;

4.3.7) invoking, by the security process module of the port, Port Y, the algorithm module, inputting an integrity check key of the key, KEY2, and the ciphertext information of the second payload of Frame A2, calculating the integrity check code MIC3 field and constructing Frame A3 by taking the ciphertext information of the second payload of Frame A2 as the third payload of Frame A3, updating with keyIndex of the used key, KEY2, the keyIndex field in the second header of Frame A2 as information of the third header of Frame A3 and taking calculated MIC3 as the MIC3 field of Frame A3, and performing the step 4.3.9); and 4.3.8) invoking, by the security process module of the port, Port Y, the algorithm module, inputting the integrity check key of the key, KEY2, and the second payload of Frame A2, calculating the integrity check code MIC3 field and constructing Frame A3 by taking the second payload of Frame A2 as the third payload of Frame A3, updating with keyIndex of the used key, KEY2, the keyIndex field in the second header of Frame A2 as information of the third header of Frame A3 and taking calculated MIC3 as MIC3 of Frame A3; and 4.3.9) outputting, by the security process module of the port, Port Y, Frame A3 through the interface module.

\* \* \* \* \*